(12) United States Patent
Brautsch et al.

(10) Patent No.: US 7,584,616 B2
(45) Date of Patent: Sep. 8, 2009

(54) METHOD FOR THE OPERATION OF A GAS TURBO GROUP

(75) Inventors: Andreas Brautsch, Wuerenlingen (CH); Martin Zajadatz, Dangstetten (DE)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 11/812,792

(22) Filed: Jun. 21, 2007

(65) Prior Publication Data

US 2007/0256425 A1 Nov. 8, 2007

Related U.S. Application Data

(63) Continuation of application No. PCT/EP2005/056675, filed on Dec. 12, 2005.

(30) Foreign Application Priority Data

Dec. 23, 2004 (CH) ..................................... 2146/04

(51) Int. Cl.
F02C 9/26 (2006.01)

(52) U.S. Cl. ....................... 60/773; 60/39.17; 60/39.281

(58) Field of Classification Search ............... 60/39.17, 60/39.281, 732, 733, 773, 776, 764
See application file for complete search history.

(56) References Cited

U.S. PATENT DOCUMENTS

| 2,951,341 | A | | 9/1960 | Henning, Jr. et al. |
| 3,054,257 | A | * | 9/1962 | Schelp ....................... 60/39.17 |
| 4,896,499 | A | * | 1/1990 | Rice ............................. 60/792 |
| 5,454,220 | A | | 10/1995 | Althaus et al. |
| 5,465,569 | A | | 11/1995 | Althaus et al. |

(Continued)

FOREIGN PATENT DOCUMENTS

| DE | 198 25 335 A1 | 12/1999 |
| EP | 0 321 809 B1 | 6/1989 |
| EP | 0 620 362 B1 | 10/1994 |
| EP | 0 620 403 B1 | 10/1994 |
| EP | 0 669 500 A1 | 8/1995 |

(Continued)

OTHER PUBLICATIONS

PCT/ISA/210.
PCT/ISA/201.

*Primary Examiner*—Louis J Casaregola
(74) *Attorney, Agent, or Firm*—Buchanan Ingersoll & Rooney PC

(57) ABSTRACT

A method for operating a gas turbine set comprises the compression of an air mass flow in a compressor, feeding the compressed air mass flow into a first combustion chamber, burning the first mass fuel flow in the first combustion chamber in the compressed mass air flow, expanding the resulting hot gas in the first turbine, feeding the partially expanded hot gas into a second combustion chamber, and burning a second mass fuel flow in the second combustion chamber in the partially expanded hot gas. The method furthermore comprises supplying to the gas turbine set the first mass fuel flow and the second mass fuel flow preferably in a common supply line with a fuel supply pressure, and stipulating division of the total mass flow into a first and second mass fuel flow according to a normal operation concept. When the boundary value of the fuel supply pressure for example in the preferably common supply line is not reached, there is a deviation from the division according to the normal operating concept. Relative to the normal operation concept the first mass fuel flow is reduced by the difference mass flow and the second mass fuel flow is increased at least by the difference mass flow.

14 Claims, 1 Drawing Sheet

U.S. PATENT DOCUMENTS

| | | | |
|---|---|---|---|
| 5,481,865 A * | 1/1996 | Frutsch | 60/773 |
| 6,202,399 B1 | 3/2001 | Frutschi | |
| 2003/0152880 A1 | 8/2003 | Eroglu et al. | |

FOREIGN PATENT DOCUMENTS

| | | |
|---|---|---|
| EP | 0 780 629 B1 | 6/1997 |
| WO | 92/19913 A1 | 11/1992 |
| WO | 93/17279 A1 | 9/1993 |
| WO | 01/96785 A1 | 12/2001 |

\* cited by examiner

METHOD FOR THE OPERATION OF A GAS TURBO GROUP

RELATED APPLICATIONS

This application claims priority under 35 U.S.C. §119 to Swiss Application 02146/04 filed in Switzerland on Dec. 23, 2004, and as a continuation application under 35 U.S.C. §120 to PCT/EP2005/056675 filed as an International Application on Dec. 12, 2005, designating the U.S., the entire contents of which are hereby incorporated by reference in their entireties.

TECHNICAL FIELD

The disclosure relates to a method for operating a gas turbine set. It furthermore relates to the control module of a power plant system configured for control of the gas turbine set according to a method as disclosed, and a digital code by which the control module of a power plant system is configured and induced to operate the power plant system according to the method as disclosed.

BACKGROUND INFORMATION

Operation of a gas turbine with gaseous fuel requires at least a combustible gas prepressure which must be at least as high as the pressure in the combustion chamber plus the pressure difference over the fuel system. The pressure difference is dependent largely on the volumetric fuel flow, i.e. under otherwise constant conditions on the mass fuel flow. Combustion chambers with premixing burners of the designs which have become known among others from EP 321 809, EP 780 629, WO 01/96785, WO 92/19913, WO 93/17279 require a comparatively high combustible gas pressure difference so that the combustible gas for premixed combustion can emerge with high momentum and finely distributed through the comparatively small fuel exit openings. In a modern gas turbine set which works for example in a high pressure combustion chamber with a combustible gas chamber pressure of 30 bar, for full load operation fuel pressures in the range from 40 to 50 or even 60 bar and more are required. The required combustible gas prepressure is conventionally specified in the design phase and must either be guaranteed by the gas distribution network, or expensive and complex gas compressor stations are necessary, operation of which furthermore consumes power produced by the gas turbine set, for example a power in the range from 2 to 5 MW. When the necessary combustible gas prepressure cannot be made available, the gas turbine set according to the prior art can only be operated with reduced power. Therefore the gas compressor stations are often made even redundantly; this means high additional capital expenditure.

SUMMARY

According to one sample aspect of the invention, a method of the initially mentioned type will be devised such that the disadvantages of the prior art are avoided. According to one specific aspect of the invention, a method will be devised especially such that at reduced combustible gas prepressure the gas turbine set can also continue to be operated with power delivery as high as possible without the need to operate an additional gas compressor station.

The suggested method is based on the working process of a gas turbine set with sequential combustion, as has become known for example from EP 620 362; with respect to the disclosure contents in this respect this document describes an integral component of this invention. The method proposed here on the one hand uses the fact that in the second combustion chamber the pressure is lower than in the first combustion chamber. Therefore the fuel which is reacted in the second combustion chamber must flow against a lower counterpressure such that under the assumption of the same pressure loss coefficients of the fuel distribution systems for promoting a certain mass fuel flow, a lower combustible gas prepressure or combustible gas supply pressure is sufficient. In addition, from case to case the second combustion chamber which is made for example as a self-igniting combustion chamber in the manner known for example from EP 620 403 or EP 669 500, in sample embodiments of the invention is equipped with fuel lances which have lower pressure loss coefficients than the aforementioned premixing burners which in one sample embodiment of the invention are used in the first combustion chamber. The method described here comprises supplying to a gas turbine set with sequential combustion as is known for example from EP 620 362 a total mass flow of a fuel in a common supply line with a fuel supply pressure, and dividing it at a sufficient fuel supply pressure according to a normal operation concept between a first mass fuel flow for the first combustion chamber or high pressure combustion chamber and a second mass fuel flow for the second combustion chamber of low pressure combustion chamber. The use of a common supply line is however preferably not critical, it is also possible to provide two individual feed line systems for the two combustion chambers and to supply the fuel via them with an optionally individually different or preferably essentially identical fuel supply pressure. The total mass flow in this case is the simple sum of the mass flows in these two feed lines and the normal operation concept consists in triggering the two feed line systems such that this total mass flow is divided between a first mass fuel flow for the first combustion chamber or high pressure combustion chamber and a second mass fuel flow for the second combustion chamber or low pressure combustion chamber to a certain extent according to the concept. The total mass flow is determined for example by the gas turbine set being adjusted to a certain useful output power, therefore such that the useful output power delivery of the gas turbine set corresponds to a setpoint. The normal operation concept for example comprises specifying the division of the total mass flow between the first and second combustion chambers as a function of the delivery of the useful output power of the gas turbine set, the delivery of the useful output power being used as an absolute or as a relative quantity referenced to the maximum output; one skilled in the art is familiar with the maximum output of an air-breathing gas turbine set varying greatly with the ambient states and especially the temperature and pressure at the compressor inlet. In another embodiment of the method, the normal operation concept comprises determining the entry temperature of the hot gas upon entry into the first turbine in a suitable and recognized manner and dimensioning the first mass fuel flow such that the entry temperature reaches an allowable upper boundary value; the portion of the total mass flow in excess is then metered to the second combustion chamber. These two exemplary embodiments can be used to complement one another, at low outputs the first exemplary type of fuel division is used, and the second is used as a temperature limiter for the entry temperature of the first turbine at high outputs. When the fuel supply pressure falls below a boundary value, there is a deviation from the normal operation concept. Compared to the normal operation concept, the first mass fuel flow is reduced by a difference mass flow and the second mass fuel flow is increased by the difference mass flow. In the case of two individual feed line systems for the two combustion chambers it is possible to deviate from the normal operation concept when the fuel supply pressure falls below a boundary value in only one or in both feed line systems. In a preferred case of a common supply line for the first and the second combustion chambers, there is a deviation from the normal operating concept when the fuel supply pressure falls below a boundary value in this common supply line.

In one exemplary embodiment of the invention the fuel supply pressure is directly measured, for example by means of a pressure sensor. In other embodiments of the invention the fuel supply pressure is determined in some other suitable manner.

The pressure boundary value can be definitively stipulated or stipulated depending on the mass fuel flow and/or dynamically determined such that the boundary value is higher, the greater the total mass fuel flow or mass fuel flow of the first combustion chamber. In another development of the method the boundary value of the fuel supply pressure which triggers shifting of the fuel division between the two combustion chambers and a deviation from the normal operating concept, is stipulated depending on the delivery of useful output power of the gas turbine set.

In one exemplary development of the invention the difference mass flow by which the mass fuel flow of the first combustion chamber is reduced is fixed depending on the difference between the pressure boundary value and the actual supply pressure, the difference mass flow being greater, the smaller the actual supply pressure.

When using premixing burners which are operated lean in gas turbine combustion chambers, dividing the mass fuel flow among different burners and/or groups of burners according to a for example load-dependent distribution pattern is known. In this way especially for reduced mass fuel flows the combustion stability is increased by individual burners and/or burner groups being selectively operated with a mixture which is richer in fuel compared to the overall stoichiometry. From case to case it can be very advantageous if when the mass fuel flow of the first combustion chamber changes the internal fuel distribution of the first combustion chamber is matched to different burners and/or groups of burners.

In one embodiment of the method suggested here, when the fuel supply pressure falls below a boundary value, the mass fuel flow of the first combustion chamber is reduced by a difference mass flow and the second mass fuel flow to the second fuel chamber is increased at least by the difference mass flow. According to one sample embodiment of the method, the total mass fuel flow here is kept constant such that the mass fuel flow to the second combustion chamber is increased by exactly the amount by which the mass fuel flow to the first combustion chamber is reduced. In another sample development of the method the mass fuel flow of the first combustion chamber is reduced by the difference mass flow, and the increase of the mass fuel flow of the second combustion chamber is controlled such that the useful output power of the gas turbine set remains constant. Generally the increase of the mass fuel flow of the second combustion chamber is then somewhat higher than the reduction of the mass fuel flow of the first combustion chamber. The entire mass fuel flow therefore rises for the same output, but the likewise power-consuming operation of a gas compressor station is avoided; this ultimately makes up for the loss of efficiency. The useful output power is measured for example as the terminal output of a generator driven by the gas turbine set.

The embodiments of the method described here, which embodiments were described in the paragraph above, are used especially when the delivery of the useful output power of the gas turbine set is essentially constant, and the fuel supply pressure drops. Another embodiment of the invention becomes especially noticeable when the gas turbine set is operated with a certain delivery of the useful output power in partial load operation, the fuel supply pressure being sufficient to divide the total mass flow necessary for this purpose according to the normal operating concept between the first mass fuel flow to the first combustion chamber and the second mass fuel flow to the second combustion chamber. When the useful output power increases, the total mass flow and the required fuel supply pressure also rise. At a sufficient fuel supply pressure the total mass flow is furthermore divided between the two combustion chambers according to the normal operation concept. When the boundary value of the fuel supply pressure is not reached, the first mass fuel flow is not further increased, and the increase of the total mass flow which is necessary to raise the delivery of useful output power is added in its entirety to the second mass fuel flow. Especially when the pressure in the first combustion chamber continues to rise based on the rising output, it will also be necessary to reduce the first mass fuel flow as the delivery of the useful output power continues to rise, by which the increase of the second mass fuel flow is again more dramatic.

In operation of a power plant system according to the method described here, it is controlled for example by a control module. The invention therefore also comprises a control module of a power plant system which is configured to operate a gas turbine set according to the method described above. The control module is configured in one exemplary embodiment of the invention by a digital code being loaded into the control module and being executed, which digital code forces the control module to operate the power plant system according to the above described method. For example input signals which provide information about the operating state and different operating parameters of the gas turbine set are acquired, processed and on their basis output signals and control signals are formed. The output signals are generated from the input signals for example by a processor which is programmed accordingly by the digital code. In this respect, the invention also comprises a digital code which is suited to configuring the control module such that it forces the gas turbine set to execute the above described method. Furthermore, the invention comprises a data medium on which the digital code and/or the source code of the digital code is stored. The concept of a data medium should be understood in the broadest sense here, such that for example magnetic and optical storage media or memory chips can be subsumed under it. The concept explicitly comprises nonvolatile memory modules and logic modules or systems of logic modules, especially programmable logic modules, which are programmed and suited to being installed in a control module and configuring it in the aforementioned sense.

Other embodiments and developments of the invention will become understandable to one skilled in the art using the following embodiments and the description.

BRIEF DESCRIPTION OF THE DRAWING

The invention is detailed below using one embodiment shown in the drawings. The sole FIGURE shows in a schematic a gas turbine set with sequential combustion, as has become known for example from EP 620 362, in addition to a schematic of supply with combustible gas and control of the combustible gas supply. For purposes of clarity the FIGURE is highly schematic; details not necessary for understanding of the invention have been omitted. The exemplary embodiments and the drawing will be used for better understanding of the invention, and should not be used for limitation of the invention described in the claims.

DETAILED DESCRIPTION

Figure 1:
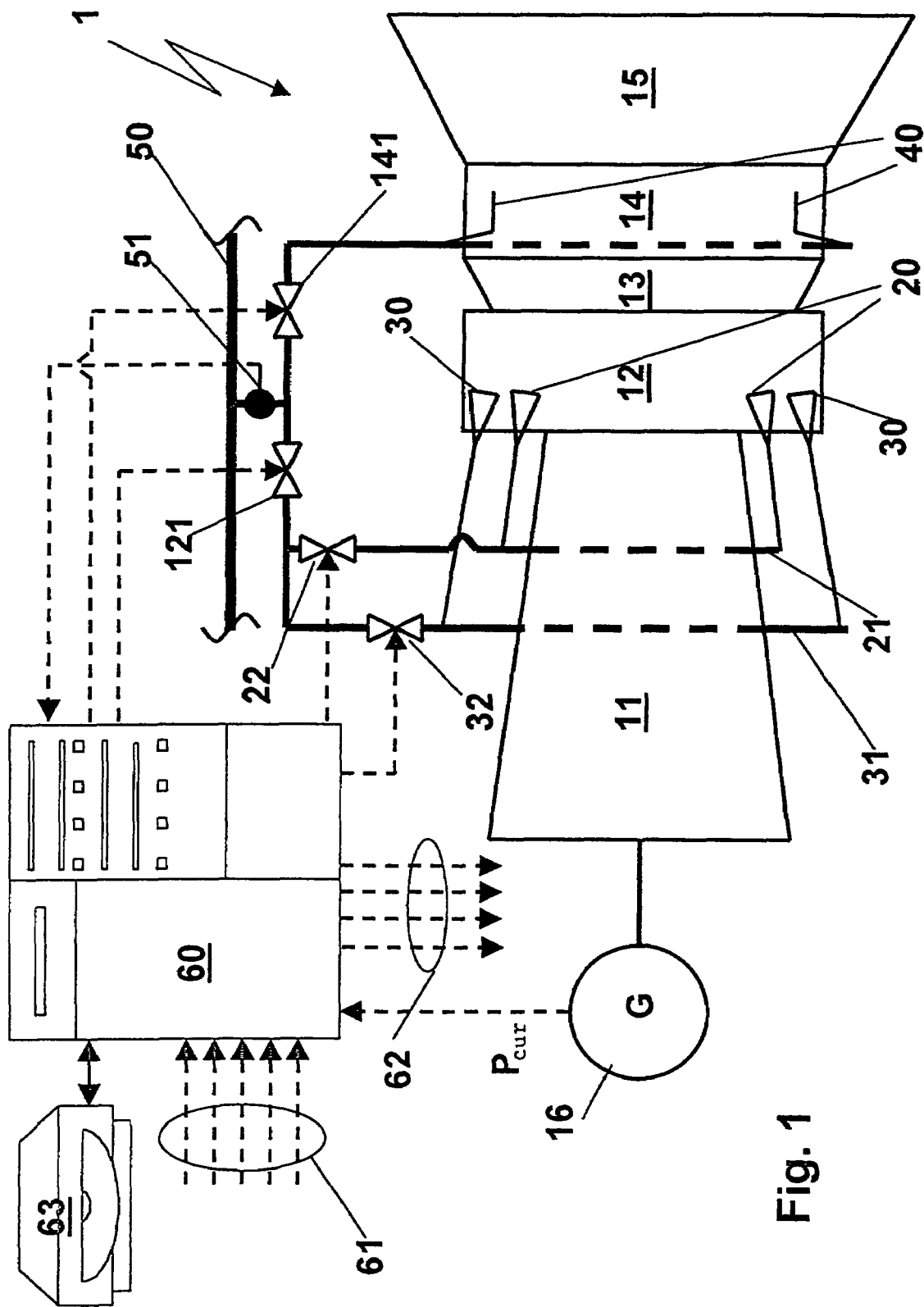

The FIGURE schematically shows a gas turbine set 1 as has become known for example from EP 620 362. In operation of this gas turbine set a mass air flow is compressed in the compressor 11 and fed to a first combustion chamber or high pressure combustion chamber 12. In the first combustion chamber, a first mass fuel flow is supplied to the compressed mass air flow and burned. The hot gas which forms is partially relieved in a first turbine or high pressure turbine 13, the pressure ratio in the first turbine for example being around 2. The partially relieved hot gas emerges from the first turbine 13 with a still high temperature and a residual oxygen content of conventionally more than 15 percent. This partially relieved hot gas flows into a second combustion chamber or low pressure combustion chamber 14, where a second mass fuel flow is supplied to the hot gas. Based on this still high temperature of the partially expanded hot gas, the second mass fuel flow ignites spontaneously and heats the partially expanded hot gas. This reheated hot gas is further expanded in the turbine 15, also called a low pressure turbine, for example to roughly atmospheric pressure. The shaft output delivered when the hot gases in the turbines are expanded is used on the one hand to drive the compressor; the remaining part of the shaft output is used as the useful output power to drive a generator 16, which delivers useful electrical power to an electrical grid which is not shown. In a manner which is not shown but which is familiar to one skilled in the art, the exhaust heat potential of the outflowing flue gas can be used for example to generate steam. The fuel is supplied to the first combustion chamber 12 via burners 20, 30. They are indicated as burners of the design known for example from EP 321 809. In these burners a swirled flow of combustion air is produced, into which gaseous fuel is injected finely distributed via fine combustible gas openings.

Based on the finely distributed injection of the fuel, in these burners there is a high pressure loss coefficient in the combustible gas flow. This means that for injection of a certain mass fuel flow a comparatively high pressure difference of the combustible gas is required. Moreover, in the combustion chamber 12 the highest pressure of the entire working process prevails; for example it can be roughly 30 bar and also higher. Thus a very high combustible gas supply pressure is necessary, the necessary pressure being able to reach a magnitude of for example 50 to 60 bar, relative to the fuel chamber pressure of 30 bar. The finely distributed injection of the combustible gas in conjunction with intensive premixing of fuel and combustion air enables lean combustion and very low nitrogen oxide emissions with simultaneously good burnout, but requires, as shown, a high combustible gas prepressure for throughput of a certain mass flow. In the first combustion chamber 12 of the gas turbine set 1 shown by way of example, the burners which are otherwise located in an annular arrangement around the axis of the machine are combined into two separately triggerable groups of burners. The burners 20 of the first group are connected to a first annular line 21 to which a mass fuel flow is metered via a setting element 22.

The burners 30 of the second group are connected to a second annular line 31; the fuel is metered via a setting element 32. According to the operating mode of the first combustion chamber 12 known from the prior art, a burner group, for example the burners 20, is supplied with so much fuel that these burners always work in a stable, i.e. relatively fuel-rich, operating range. A rising fuel amount is metered to the burners 30. Based on the support by stable burners 20 of the first burner group, the burners 30 can also be operated with a very fuel-lean mixture which would not ensure in itself stable combustion. On the other hand, metering fuel to the burners 30 avoids excess enrichment of the fuel-air mixture of the burners 20 which would lead to increased nitrogen oxide emissions and potentially to harmful overheating of the burners. In this way this mass fuel flow is divided between the two burner groups; this division is dependent at least roughly on the mass fuel flow of the first combustion chamber 12; in practice this division often takes place as a function of the useful output power or the relative output, for formation of which the current output is referenced to the full load output of the gas turbine set. Of course, there is no limitation to two burner groups; in practice, arrangements with more than two burner groups, or connection of individual burners, are known. Likewise arrangements are known in which depending on the output individual burners are turned on and off, and one burner group is continuously controlled. But it is not necessary at this point to definitively discuss these burner connections and operating concepts in detail because this is not of primary importance to the invention.

The second combustion chamber 14, which in contrast to the first combustion chamber 12 which is called the high pressure combustion chamber, is called the low pressure combustion chamber, is made in one exemplary embodiment as a self-igniting combustion chamber in a design which is known for example from EP 669 500. In such a combustion chamber the oxygen-containing hot gas with a high temperature flows via eddy-producing elements which are not shown, but which are known from the cited prior art. Downstream of the eddy-producing elements are fuel lances 40 which inject a second mass fuel flow into the hot gas flow. In a manner which is not shown in the flow channel downstream of the lances 40 there is a sudden change in the cross section at which the flame zone is stabilized. The temperature of the hot gas upon entry into the second combustion chamber is typically roughly 850° C. and higher, while the temperature of the hot gas upon entry into the second turbine or low pressure turbine 15 is in the range from roughly 1200 to 1300° C. Based on the firebox output which is much lower compared to the first combustion chamber and the short residence time of the combustion products in this high speed combustion chamber and the inherently good mixing of the fuel in the hot gas eddy flow which is flowing at high speed, the fuel can be delivered in the second combustion chamber with a much lower pressure difference, or the fuel lances 40 can be made with a much lower pressure loss coefficient than the burners 20 and 30 of the high pressure combustion chamber 12.

Moreover the pressure in the second combustion chamber is clearly below the pressure in the first combustion chamber; with the numerical values given by way of example above, there is still a pressure of about 15 bar here, the counterpressure against which the combustible gas must flow is around 15 bar below that in the first combustion chamber. Thus the requirements for the combustible gas prepressure for throughput of the same mass fuel flow is much less than in the first combustion chamber. This fact is exploited by the invention as shown below. The combustible gas is delivered via the main line 50 which is for example part of a higher-level distribution network. The gas turbine set is connected to the main line 50 via a transfer station 51 which is indicated only schematically. The total mass fuel flow is divided between the two combustion chambers of the gas turbine set via setting elements 121 and 141. This division takes place using a given pattern which is described elsewhere, for example depending on the output. All control and adjustment of the gas turbine set are assumed by the control module 60. The control module 60 acquires input values 61 which comprise for example information about the operating state of the gas turbine set. These input values include for example also the current useful output power $P_{cur}$. As a function of these input values, output values 62 are formed which are relayed as control signals to the setting elements of the gas turbine set. They include control commands for the mass fuel flow setting elements 22, 32, 121, 141. The control module is for example a digital computer unit which is programmed by a computer program stored on a data medium 63 and thus configured for control and adjustment of the gas turbine set. In this example the combustible gas supply pressure is measured at the transfer station 51 and likewise evaluated in the control module 60. Conventionally in the design of a power plant system a combustible gas prepressure is specified which must be made available by the distribution network.

In cases in which this pressure cannot be guaranteed under all circumstances, installation of a gas compressor station is known which compresses the combustible gas from the main line 50 to the necessary prepressure. When the combustible gas supply pressure falls below a value which is still sufficient to route a certain mass fuel flow to the first combustion chamber 12, according to the prior art a gas compressor station is started which produces the necessary combustible gas prepressure. But its operation consumes considerable power. Moreover the installation and maintenance of a gas compressor station of the required size are very capital intensive. According to the invention the installation and operation of a gas compressor station can now be abandoned. When the control module 60 records a drop of the combustible gas supply pressure below a minimum value, the setting element 121 is closed by an amount and thus the partial mass fuel flow which is routed to the first combustion chamber 12 is reduced by the difference mass flow. At the same time the setting element 141 is opened so wide that at least the difference mass flow is routed in addition to the second combustion chamber 14. This means that part of the total mass fuel flow is rerouted from the high pressure combustion chamber 12 into the low pressure combustion chamber 14, where on the one hand the counterpressure is lower, and on the other in one exemplary embodiment of the invention there must be a lower pressure difference for throughput of a certain mass flow. In one embodiment of the invention, in the first combustion chamber 12 the division of the fuel among the burners 20 of the first group and the burners 30 of the second group are matched to the lower mass fuel flow. Thus the stability of combustion in the first combustion chamber is ensured. Combustion of a certain mass fuel flow in the second combustion chamber 14 generally results in a slightly reduced useful output power compared to the reaction in the high pressure combustion chamber 12. In one embodiment of the invention the setting element 141 is opened so wide that the useful output power of the generator is maintained, therefore compared to the original operating state, a higher total mass fuel flow is fired. This means that compared to the original operating state of the gas turbine set the efficiency drops for the time being; but since no power is consumed for operation of the gas compressor station, this loss of efficiency is qualified or entirely balanced compared to the prior art, if not overcompensated.

Other embodiments and developments of the invention will be apparent to one skilled in the art based on the aforementioned.

It will be appreciated by those skilled in the art that the present invention can be embodied in other specific forms without departing from the spirit or essential characteristics thereof The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE NUMBER LIST

1 gas turbine set
11 compressor
12 first combustion chamber, high pressure combustion chamber
13 first turbine, high pressure turbine
14 second combustion chamber, low pressure combustion chamber
15 second turbine, low pressure turbine
16 generator
20 burner
21 annular line
22 setting element
30 burner
31 annular line
32 setting element
40 fuel lance
50 main combustible gas line
51 transfer station
60 control module
61 input signals
62 output signals, setting signals
63 data medium
121 setting element
141 setting element
$P_{cur}$ useful output power of the gas turbine set

What is claimed is:

1. Method for operating a gas turbine set, comprising:
   compression of an air mass flow in a compressor,
   feeding the compressed air mass flow into a first combustion chamber,
   burning a first mass fuel flow in the first combustion chamber in the compressed air mass flow,
   expanding resulting hot gas in a first turbine,
   feeding partially expanded hot gas into a second combustion chamber,
   burning a second mass fuel flow in a second combustion chamber in the partially expanded hot gas,
   supplying to the gas turbine set the first mass fuel flow and the second mass fuel flow with a fuel supply pressure, and
   dividing the total mass flow into the first and second mass fuel flows according to a normal operation mode, wherein when a limit value of fuel supply pressure is not reached, deviating from the division according to the normal operation mode such that the first mass fuel flow is reduced by a difference mass flow and the second mass fuel flow is increased at least by the difference mass flow.

2. Method as claimed in claim 1, wherein the method furthermore comprises supplying to the gas turbine set the first mass fuel flow and the second mass fuel flow in a common supply line with a fuel supply pressure, when the limit value of the fuel supply pressure in the common supply line is not reached there being a deviation from the division according to the normal operation mode, and relative to the normal operation mode reducing the first fuel mass flow by the difference mass flow, and increasing the second mass fuel flow by at least the difference mass flow.

3. Method as claimed in claim 1, wherein the normal operation mode comprises dividing the total mass flow as a function of the delivery of useful output power ($P_{cur}$) of the gas turbine set.

4. Method as claimed in claim 1, comprising determining the entry temperature of the hot gas upon entry into the first turbine for dividing the total mass flow, metering the first mass fuel flow to the first combustion chamber such that the entry temperature reaches an allowable upper limit value, and metering the portion of the total mass flow in excess to the second combustion chamber as a second mass fuel flow.

5. Method as claimed in claim 1, comprising setting the total mass flow such that the delivery of useful output power of the gas turbine set corresponds to a setpoint.

6. Method as claimed in claim 1, comprising establishment of the limit value of the fuel supply pressure depending on the delivery of useful output power of the gas turbine set.

7. Method as claimed in claim 1, comprising directly measuring the fuel supply pressure.

8. Method as claimed in claim 1, comprising fixing the difference mass flow depending on the difference between the pressure limit value and an actual supply pressure, the difference mass flow being greater, the smaller the effective supply pressure.

9. Method as claimed in claim 1, comprising matching internal fuel distribution of the first combustion chamber depending on a change of the first mass fuel flow.

10. Method as claimed in claim 1, comprising keeping the total mass flow constant, reducing the first mass fuel flow by the difference mass flow, and increasing the second mass fuel flow by the difference mass flow.

11. Method as claimed in claim 1, comprising reducing the first mass fuel flow by the difference mass flow, increasing the second mass fuel flow by the difference mass flow, and increasing the second mass fuel flow by another mass flow such that the delivery of useful output power of the gas turbine set is kept constant.

12. Method as claimed in claim 1, comprising increasing the delivery of useful output power of the gas turbine set, increasing the total mass flow, dividing the total mass flow according to the normal operation mode between the first mass fuel flow and the second mass fuel flow, and when the limit value of the fuel supply pressure is not reached, not continuing to raise the first mass fuel flow, and metering the increase of the total mass flow which is necessary to increase the delivery of useful output power to the full extent to the second mass fuel flow.

13. Method as claimed in claim 9, comprising reducing the first mass fuel flow by the difference mass flow, increasing the second mass fuel flow by the difference mass flow, and increasing the second mass fuel flow by another mass flow such that the delivery of useful output power of the gas turbine set is kept constant.

14. Method as claimed in claim 9, comprising increasing the delivery of useful output power of the gas turbine set, increasing the total mass flow, dividing the total mass flow according to the normal operation mode between the first mass fuel flow and the second mass fuel flow, and when the limit value of the fuel supply pressure is not reached, not continuing to raise the first mass fuel flow, and metering the increase of the total mass flow which is necessary to increase the delivery of useful output power to the full extent to the second mass fuel flow.

* * * * *